A. SUNDH.
ELECTROMAGNETIC BRAKE APPARATUS.
APPLICATION FILED OCT. 2, 1907.

960,055.

Patented May 31, 1910.

Witnesses:
Ernest L. Gale, Jr.
James G. Bethell

Inventor
August Sundh
By Attorney
C. M. Nissen

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

ELECTROMAGNETIC BRAKE APPARATUS.

960,055.

Specification of Letters Patent. Patented May 31, 1910.

Application filed October 2, 1907. Serial No. 395,626.

*To all whom it may concern:*

Be it known that I, AUGUST SUNDH, a citizen of the United States, residing in Yonkers, in the county of Westchester and State of New York, have invented a new and useful Improvement in Electromagnetic Brake Apparatus, of which the following is a specification.

My invention relates to magnetic brake apparatus; and one of its objects is the provision of multiple electro-magnetic mechanism for effecting the gradual application of a brake.

Another object of the invention is to provide multiple electro-magnetic mechanism to quickly release a brake.

Further objects will appear more fully hereinafter, the novel combinations of elements being set forth in the claims.

Figure 1:
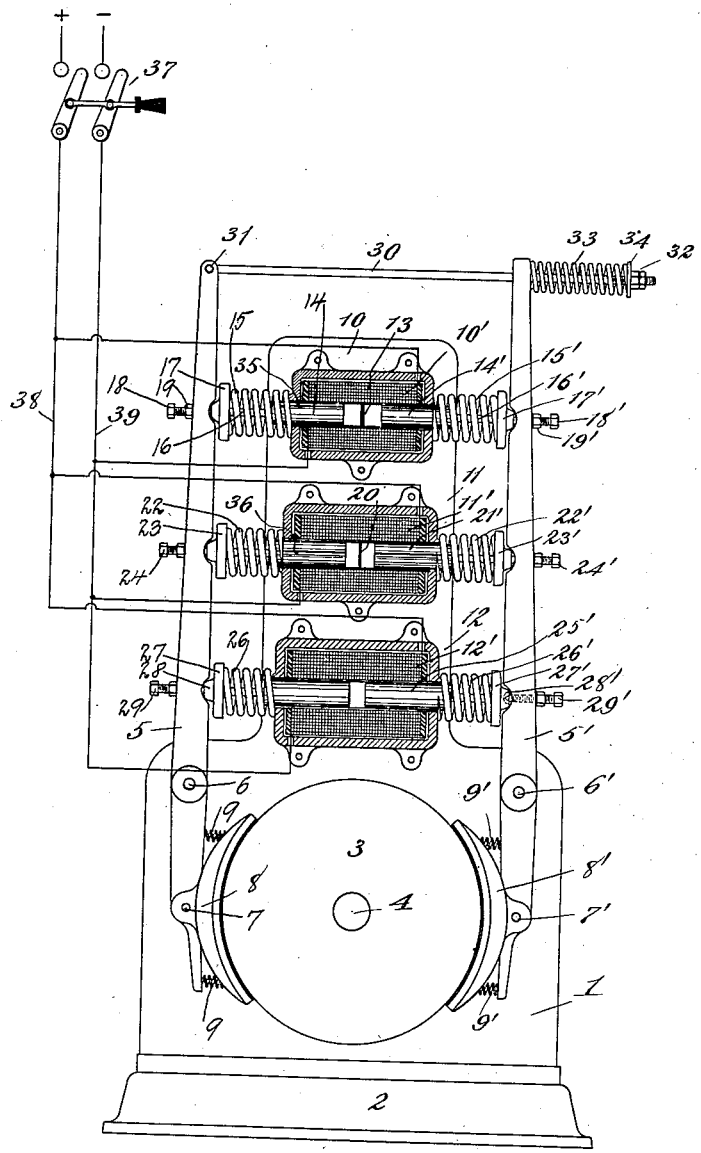
Figure 2:
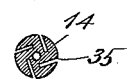
Figure 3:
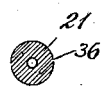
Figure 4:

Referring to the accompanying drawing, Figure 1 is a front elevational view in part section of a magnetic brake embodying my invention. Figs. 2, 3 and 4 are sectional details of parts shown in Fig. 1.

Similar characters of reference designate corresponding parts in all of the figures.

In substantially all electro-magnetic brake apparatus in use at the present time, a single magnet of relatively large size is used to effect the release of the brake members, and the magnet is preferably of the well known solenoid type. Such brake apparatus is objectionable for the reason that it is sluggish in its releasing action, and when the same is deënergized the brake is immediately applied with maximum pressure.

A magnet brake constructed according to my invention not only withdraws the brake shoes very quickly, but effects the application of the brake in such manner that the braking effect is gradually increased from zero to a maximum, thereby producing a smooth and easy stop.

The above features are especially desirable where a magnet brake is used in connection with electric passenger elevators, and it is for just such use that my invention is particularly adapted.

I will now describe the apparatus embodying my invention and point out its operation.

3 designates a rotating part or brake pulley connected to an operating mechanism. For example, it may be fixed on the armature shaft 4 of an electric motor.

8 and 8' designate brake members which may be of any suitable construction and which when applied to the part 3 tend to stop the latter from rotating. As here shown the brake members 8, 8' are in the form of shoes. The brake shoes 8 and 8' are arranged to be withdrawn or released from the brake pulley 3 by electro-magnetic means, and the electro-magnetic means is arranged when deprived of its exciting current to permit the brake shoes to be gradually applied to the brake pulley 3.

5 and 5' are brake levers pivoted at 6 and 6', respectively, to the frame 1 carried upon a bed 2. Each brake lever is provided with brake shoes 8 and 8', respectively, which are pivoted at 7 and 7' to the brake levers 5 and 5' and which are held in proper relation to the brake pulley 3 by the springs 9 and 9'. The engaging faces of the brake shoes may be faced with leather or other suitable material if desired, and such facing is indicated on the drawing by heavy black lines. A rod 30 is connected to the brake lever 5 at 31 and passes loosely through a clearance hole in the brake lever 5'. A compression spring 33 is carried upon the rod 30 and bears against the brake lever 5' and a collar 34, which latter is adjustable along the rod 30 by means of the nuts 32. By adjusting these nuts the tension of the spring 33 may be varied as desired.

Attached to the frame 1 are electro-magnets of the solenoid type, namely, 10, 11 and 12. These magnets are preferably of different sizes, the magnet 10 being the smallest, the magnet 11 somewhat larger, while the magnet 12 is still larger. This arrangement may be reversed so that magnet 12 will be the smallest, magnet 11 of intermediate size, and magnet 10 the largest. Each magnet is symmetrical in form and all are substantially similar in construction, the main difference being found in the construction and relative positions of their respective magnet cores.

The upper magnet 10 comprises a metallic magnet frame arranged to contain a solenoid winding 10' which in practice is wound upon a spool or bobbin. Two cores 14 and 14' are arranged to move in and out of the solenoid winding 10' and these cores are connected to recessed collars 17 and 17', respectively, by screw-threaded rods 16 and 16', adjustable in correspondingly threaded openings in the cores. A pair of tension springs 15 and 15' respectively surround the threaded rods 16 and 16' and are placed between the recessed collars 17 and 17' and some fixed part of the apparatus, for example the opposite ends of the frame of magnet 10. A washer 13 of leather or other suitable material is provided at the center of the solenoid and lies midway between the cores 14 and 14'. The lever arms 5 and 5' are provided with pointed set screws 18 and 18', respectively, which are in horizontal alinement with the magnet cores 14 and 14'. The pointed end of each set-screw lies in a recess provided in the collars 17 and 17' and each set screw may be individually adjusted and locked in position by the nuts 19 and 19'. The magnet 11, as before stated, is substantially similar in construction to the magnet 10 just described, although somewhat larger in size. The cores of this magnet lie closer together when the brakes are applied than do the cores of the magnet 10, and the washer 20 is somewhat thinner than the washer 13. The distance between the inner ends of the cores allows for movement of the brake levers. The cores of the magnet 12 lie still closer together when the brakes are applied, and in this magnet I do not purpose to use any washer.

Referring to Figs. 2, 3 and 4, the different constructions of the magnet cores is readily seen. The cores 14 and 14' each contain four slots uniformly spaced, and which are preferably cut in the cores on planes somewhat removed from the axes of the cores. The cores of the magnet 11 each contain two similar slots arranged diametrically opposite each other. The cores of the magnet 12 do not contain slots, but are left solid. The slots counteract eddy currents and the magnet having the core with the greatest number of slots will act quicker both in actuating and releasing.

The solenoid windings of the magnets 10, 11 and 12 are connected in parallel with each other, each having its terminals connected to the main wires 38 and 39, respectively, which in turn are connected through the switch 37 to a suitable source of electrical supply designated by + and —.

The spring 33 tends to force the upper ends of the brake levers 5 and 5' together and thereby move the brake levers about their respective pivots 6 and 6', and thus withdraw the brake shoes 8 and 8' from engagement with the periphery of the brake pulley 3. This tendency, however, is more than overcome by the combined action of the springs 15, 22, 26 and 15', 22', 26' and the brake is applied with maximum pressure.

In order to release the brake shoes and allow the rotating member 3 to turn, the switch 37 is closed, thereby connecting all of the brake magnets 10, 11 and 12 simultaneously to the source of current supply + and —, and the same are energized to move their respective cores together against the action of the various springs connected therewith. Since the magnet 10 is farthest removed from the pivots 6 and 6' of the corresponding brake levers 5 and 5', the cores of this magnet will have a relatively long movement indicated on the drawing by the length of air gap between the cores 14 and 14'. The magnet 11 is somewhat nearer the pivots 6 and 6' and the leverage or mechanical advantage of this magnet with respect to the magnet 10 is not so great, consequently the movement of its cores will be smaller and the air gap between the cores of this magnet will also be smaller. The magnet 12 being nearest the pivots 6 and 6' will have the smallest air gap of all.

The washers 13 and 20 which lie between the cores of the magnets 10 and 11, respectively, not only space the cores when in their energized position but also act as cushions or buffers to prevent noise. As the different magnets become energized their cores are drawn together, compressing the springs at both ends of each magnet and permitting the spring 33 to move the upper ends of the brake levers together, which effects the release of the brake shoes 8 and 8' from engagement with the brake pulley 3.

It is well known that a small magnet will become energized to operate its core or movable member upon closing a circuit through its magnetizing coil much quicker than a similar magnet of larger size. This is largely due to the smaller amount of magnetic material comprised in the smaller magnet in which the effects of self-induction are relatively small. The greater the inductance, the greater the time constant of the magnet. Thus it is readily seen that by using a plurality of brake-releasing magnets suitably connected to the current supply mains, the same build up in magnetic strength and effect the operation of their cores much quicker than would a single magnet of large size, and it is an easy matter to so arrange the plurality of magnets that their operation may be substantially instantaneous. This feature of quick releasing means is valuable in connection with the proper operation of electric elevators, since it is customary to close the circuit to the hoisting motor at the same time that the brake-releasing circuit is closed, and, should the brake be sluggish in its action, the starting current for the motor may flow for some time before the brake allows the motor to start. My invention obviates this difficulty, for by reason of the quick release of the braking means the motor is enabled to start at substantially the same instant that the motor circuit is closed, thus avoiding useless waste of starting current and undue strain upon the hoisting apparatus.

In order to apply the brakes the main switch 37 is first opened, thereby interrupting or cutting off the current supply to the windings of the brake magnets. The cores of magnet 10 will be the first to return to their deënergized position, being moved outwardly by the springs 15 and 15', and the recessed collars 17 and 17' will abut against the set screws 18 and 18', respectively, and force the upper ends of the brake levers 5, 5' outwardly, overcoming the action of the spring 33 and gently applying the brake shoes 8, 8' to the pulley 3. The cores of magnet 10 will operate before the cores of the magnets 11 and 12 because of the slots 35 in its cores 14 and 14', as these slots tend to counteract the retarding effects of eddy currents in the core. Furthermore, the magnet 10 has a smaller number of turns and its self-induction for that reason is less than that of the magnets 11 and 12. Thus the springs 22 and 22' will force the recessed collars 23 and 23' into engagement with the set screws 24 and 24', respectively, a short time after the corresponding parts of the magnet 10 have performed their functions. The magnet 12 is the last one to act, since the cores of this magnet contain no slots and the self-induction is a maximum. Therefore the springs 26 and 26' of this magnet do not operate to increase the braking effect until after the magnets 10 and 11 have operated.

From the foregoing it is seen that the application of the brake shoes is not effected at once, but a certain degree of braking effect is first produced by the application of one set of springs, shortly afterward followed by the application of an additional set of springs, and finally the maximum braking effect is produced by the application of a third set of springs. While the consecutive operation of these different sets of springs may take place in a very short space of time, the gradually increasing pressure of the brake shoes upon the brake pulley 3 produces a smooth and easy stop which is a particularly valuable feature in the efficient operation of electric elevators, as well as in many other devices where an electrically operated brake may be used. The position of any one of the magnet cores may be separately adjusted by means of the corresponding threaded rods, such as 16 and 16', which may be screwed into or out of their respective cores, and the tension of each magnet spring may be regulated by adjusting its corresponding set screw such as 18 and 18'.

While I have shown three brake magnets of varying size for effecting the operation of my brake apparatus, I contemplate using either a greater or less number, depending largely upon the requirements of any particular case. Furthermore, where a plurality of magnets is used, if one should become disabled the remaining magnet or magnets would still be sufficient to operate the brake apparatus. By placing the magnet first to release nearest the rotating member 4 the leverage on the brake levers as the successive pairs of springs act may be gradually increased. If single phase current is used I prefer to laminate all the cores and core frames and secure successive operation by electric switches controlling the magnets such that upon the release of the first magnet a switch is operated to open the circuit of the next magnet, and so on.

While the foregoing description applies to a preferred form of magnetic brake apparatus embodying my invention, I do not wish to be limited to the specific construction and arrangement of parts, as it is obvious that various changes could readily be made by those skilled in the art without departing from the spirit or scope of my invention.

What I claim is:—

1. The combination with a brake, of mechanism for applying the brake, and a plurality of electro-magnets of different capacities for effecting a release of the brake and each being operative independently of the operation of the others.

2. The combination in a brake, of a brake lever, a brake shoe, mechanism for operating the brake lever in one direction to apply the brake shoe to a movable member, and a plurality of electro-magnets of varying capacities operative in opposition to said operating mechanism.

3. In electro-magnetic brake apparatus, the combination with a brake lever and a brake shoe, of a plurality of electro-magnets of different inductances operatively connected to the brake lever to control the operation of the same in one direction, and mechanism for actuating said lever in another direction.

4. In electro-magnetic brake apparatus, the combination with a brake lever and a brake shoe, of mechanism for operating the lever to apply the brake, and a plurality of electro-magnets of varying inductances opposing said brake applying mechanism, and of sufficient strength when energized to overcome the power of said applying mechanism and permit the release of the brake.

5. In electro-magnetic brake apparatus, the combination with a brake lever, a brake shoe and springs for applying the brake, of a plurality of electro-magnets of different inductances connected in parallel circuits, and switch mechanism for controlling said electro-magnets.

6. In electro-magnetic brake apparatus, the combination with a brake lever and a brake shoe, of a plurality of electro-magnets and springs opposing the operation of the electro-magnets and operating upon said lever at different distances from its fulcrum.

7. In electro-magnetic brake apparatus, the combination with a brake lever and a brake shoe, of a plurality of electro-magnets of different strengths in position to control the operation of the lever and located at distances from the fulcrum of the lever, varying inversely as the strength of the magnets.

8. In electro-magnetic brake apparatus, the combination of a pair of pivoted brake levers and brake shoes carried by the levers, and a plurality of electro-magnets located between said levers and of a strength and inductance substantially inversely proportional to their distances from the fulcrums of the levers.

9. In electro-magnetic brake apparatus, the combination with a brake lever, of a plurality of electro-magnets, each comprising a frame and a magnetic core or armature, extensions from said cores, springs interposed between the magnet frames and said extensions to hold the latter in their outward positions against the brake lever when the magnets are deënergized, and means for moving the lever inwardly when the extensions are retracted by said electro-magnets.

10. In electro-magnetic brake apparatus, the combination with a pair of brake levers, of a plurality of electro-magnets located between the levers at different distances from their fulcrums, and each comprising movable cores, extensions carried by said cores and engaging the levers, said cores and extensions being moved inward and held in an inward position when the magnets are energized, springs associated with the extensions and holding them in an outward position when the magnets are deënergized, and means for moving the levers inwardly as the extensions are drawn inwardly by the magnets.

11. In brake apparatus, the combination with a brake shoe and an actuating device connected thereto, of automatic mechanism for applying the brake shoe to a movable member, a plurality of electro-magnets with movable cores shaped to effect varying time constants as to said electro-magnets, and connections between said electro-magnets and said levers.

12. In brake apparatus, the combination with a pair of brake shoes and a pair of brake levers connected thereto, of a plurality of brake springs for actuating said levers to apply said shoes to a rotating member, a plurality of electro-magnets for retracting said springs, and an additional spring for releasing the brake shoes when the electro-magnets are energized.

13. In brake apparatus, the combination with brake mechanism, of means for applying the brake, and electro-magnets having cores released successively to permit a gradual operation of said brake-applying-means.

14. The combination with brake mechanism, of a plurality of springs for operating said brake mechanism to apply the same, and a plurality of electro-magnets to retract said springs, one or more of the cores of said electro-magnets being slotted to effect a successive releasing of said springs to cause the brake mechanism to be applied gradually.

15. The combination with brake mechanism, of an electro-magnet having a movable core, a cup or plate connected to said core, a spring interposed between the magnet and the said cup, and an adjustable abutment between the cup and said brake mechanism.

16. The combination with symmetrical brake shoes and symmetrical levers connected thereto, of an electro-magnet between said levers having two cores, extensions from said cores normally in loose connection with said levers, and springs located at opposite ends of the electro-magnet, each spring being located between the outer end of one of said extensions and the adjacent end of the electro-magnet.

17. The combination with two brake shoes and two levers respectively connected thereto, of a plurality of separate and independent springs arranged in pairs and the pairs in a series, a corresponding series of electro-magnets respectively between the said pairs of springs, each electro-magnet having a pair of cores variously shaped to cause the electro-magnets to have different time constants or inductances, and extensions from said cores to receive the outer ends of said springs and abut against said levers.

In testimony whereof, I have signed my name to this specification in the presence of two subscribing witnesses.

AUGUST SUNDH.

Witnesses:
CHAS. M. NISSEN,
DAVID LARSON.